United States Patent
Park et al.

(10) Patent No.: US 8,519,986 B2
(45) Date of Patent: Aug. 27, 2013

(54) USER INTERFACE DEVICE AND USER INTERFACE METHOD

(75) Inventors: Wan-je Park, Seoul (KR); Hyun-kook Jang, Suwon-si (KR); Joon-hwan Kim, Seongnam-si (KR); Heui-jin Kwon, Seongnam-si (KR); Sang-gon Song, Yeongcheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 887 days.

(21) Appl. No.: 11/653,971

(22) Filed: Jan. 17, 2007

(65) Prior Publication Data
US 2007/0291018 A1 Dec. 20, 2007

(30) Foreign Application Priority Data
Jun. 16, 2006 (KR) .................. 10-2006-0054532

(51) Int. Cl.
G06F 3/033 (2006.01)
G06F 3/041 (2006.01)
G06F 3/045 (2006.01)
G06F 3/042 (2006.01)

(52) U.S. Cl.
USPC ........... 345/184; 345/173; 345/174; 345/175; 345/176

(58) Field of Classification Search
USPC .......................................... 345/173–178, 184
See application file for complete search history.

(56) References Cited

U.S. PATENT DOCUMENTS

| | | | | |
|---|---|---|---|---|
| 6,037,937 A | * | 3/2000 | Beaton et al. | 715/764 |
| 2003/0001816 A1 | * | 1/2003 | Badarneh | 345/156 |
| 2003/0095096 A1 | | 5/2003 | Robbin et al. | |
| 2006/0017857 A1 | | 1/2006 | Sata et al. | |
| 2006/0026535 A1 | * | 2/2006 | Hotelling et al. | 715/863 |
| 2006/0123362 A1 | * | 6/2006 | Keely | 715/857 |

FOREIGN PATENT DOCUMENTS

| | | |
|---|---|---|
| DE | 100 63 347 | 6/2002 |
| DE | 10063347 | 6/2002 |
| EP | 1438719 B1 | 10/2002 |
| EP | 1760573 | 3/2007 |
| KR | 10-2004-0048942 A | 6/2004 |
| WO | 02/50650 A2 | 6/2002 |

OTHER PUBLICATIONS

Office Action issued in Chinese Patent Application No. 2007100052947 on Aug. 22, 2008.
Office Action issued in corresponding European Patent Application No. 07103250.2 dated Oct. 30, 2007.

* cited by examiner

*Primary Examiner* — Amr Awad
*Assistant Examiner* — Andre Matthews
(74) *Attorney, Agent, or Firm* — Jefferson IP Law, LLP

(57) ABSTRACT

An input device for effective navigation, a user interface device and a user interface method, and a computer-readable recording medium having embodied thereon a computer program to perform the method, the user interface device including a display unit, a rotatable input unit used to instruct a movement and a selection of a highlighted item in the display unit, and a control unit to control the device to perform a function corresponding to the received signal when a movement signal or a rotation signal is received from the input unit.

10 Claims, 7 Drawing Sheets

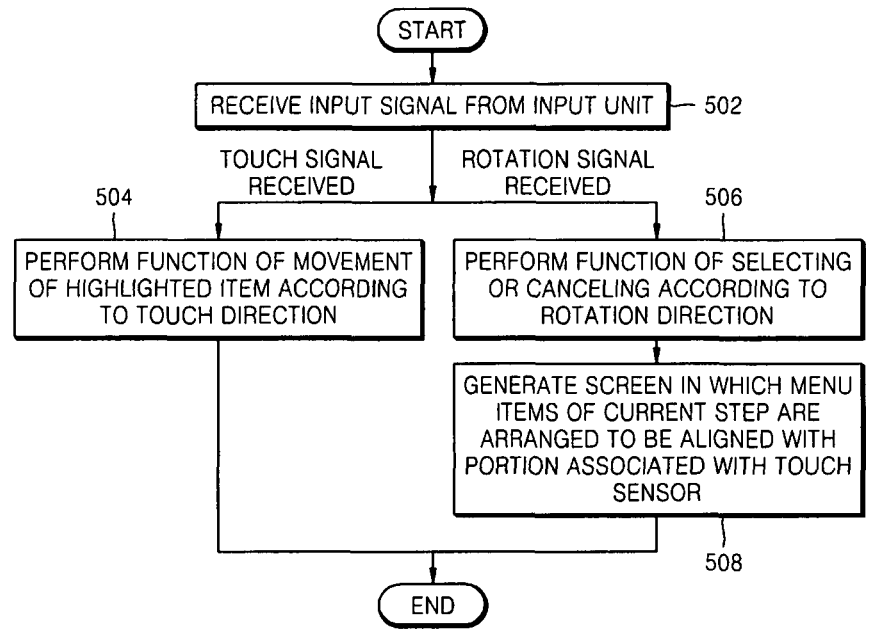
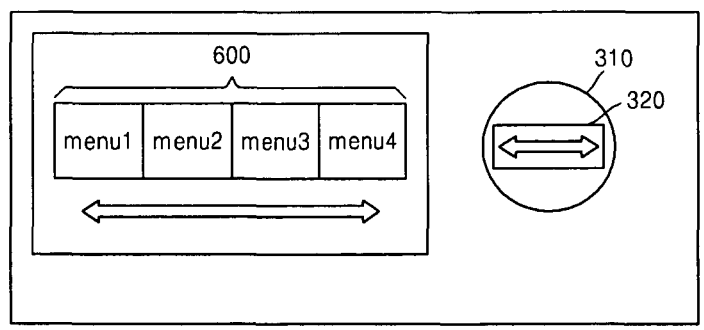

USER INTERFACE DEVICE AND USER INTERFACE METHOD

CROSS-REFERENCE TO RELATED APPLICATION

This application claims the benefit of Korean Patent Application No. 2006-54532, filed on Jun. 16, 2006, in the Korean Intellectual Property Office, the disclosure of which is incorporated herein by reference.

BACKGROUND OF THE INVENTION

1. Field of the Invention

Aspects of the present invention relate to a user interface, and more particularly, to an input device for effective navigation, a user interface device and a method used by the user interface device, and a computer-readable recording medium having embodied thereon a computer program to perform the method.

2. Description of the Related Art

FIG. 1 is a view illustrating a user interface of a conventional mobile device. Referring to FIG. 1, four arrow keys 112, 114, 116, and 118, an OK button 120, and a cancel button 122 are used for movements between menu items (navigation), selection (confirmation) of a menu item, and cancellation of a menu item. Therefore, in the conventional device, at least six buttons are generally used for navigation. This is because the function of a button is determined by the position of the button. That is, one function corresponds to one button.

SUMMARY OF THE INVENTION

Aspects of the present invention provide an input device capable of effectively navigating menus of a device by a user with a reduced number of buttons, a user interface device and a method thereof, and a computer-readable recording medium having embodied thereon a computer program to perform the method.

According to an aspect of the present invention, there is provided a user interface device including: a display unit; an input unit that is rotatable and instructs a movement and a selection of a highlighted item in the display unit; and a control unit controlling the user interface device to perform a function corresponding to a received signal when a movement signal or a rotation signal is received from the input unit.

The input unit may include a touch sensor sensing touches in at least two directions, such that the movement signal is generated from the touches in the at least two directions.

A portion in which the touch sensor operates may be visibly distinct from the rest of the input unit and is formed to have a long shape running from left to right or from top to bottom.

The control unit may determine a movement direction of the highlighted item according to a touch direction sensed by the touch sensor, and perform the movement of the highlight in the determined direction.

The control unit may determine a function to be performed according to a rotation direction of the input unit, the rotation direction being indicated by the rotation signal.

The control unit may perform a function of selecting a currently highlighted item when the input unit is rotated in a first direction, and perform a function of canceling a previous selection when the input unit is rotated in a second direction.

The input unit may be rotated clockwise or counterclockwise at an angle of substantially 90° by a user's manipulation.

The input unit may include at least two input keys showing opposite directions from each other, such that the movement signal is generated from presses of the at least two input keys.

The input unit may include a unit used to instruct a movement of the highlighted item, and the unit to instruct a movement may be visibly distinct from the rest of the input unit so that the unit to instruct a movement may be provided to have a long shape running from left to right or from top to bottom.

The input unit may include a unit to instruct a movement of the highlighted item, such that the control unit generates a screen displayed in the display unit in which items may be arranged to be aligned with the input unit.

According to another aspect of the present invention, there is provided an input device including: a touch sensor sensing touches made by a user in at least two directions and outputting a touch direction; and a rotation unit rotating the input device clockwise or counterclockwise at an angle of substantially 90° according to a rotation manipulation made by the user and outputting a rotation direction, wherein a portion in which the touch sensor operates may be visibly distinct from the rest of the input unit and be provided to have a long shape running from left to right or from top to bottom.

According to another aspect of the present invention, there is provided a user interface method used in a device including a display unit and a rotatable input unit having a touch sensor, the method including: receiving a touch signal or a rotation signal from the input unit; performing a movement of a highlighted item in the display unit according to a sensed touch direction when the touch signal is received; and performing a function associated with a rotation direction of the input unit when the rotation signal is received.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a flowchart illustrating a user interface method according to an embodiment of the present invention;

FIG. 6 is a view illustrating movement of a highlight in a horizontal direction in a user interface device according to an embodiment of the present invention;

DETAILED DESCRIPTION OF THE EMBODIMENTS

Figure 1:
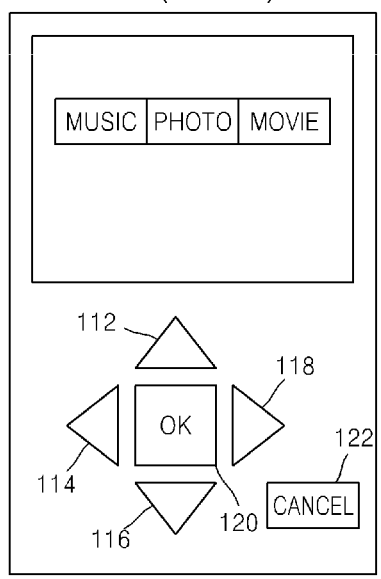
FIG. 1 is a view illustrating a user interface of a conventional mobile device.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
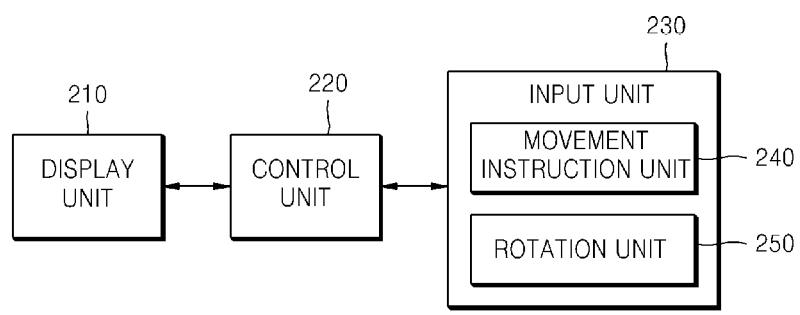
FIG. 2 is a block diagram illustrating a user interface device according to an embodiment of the present invention.

FIG. 2 is a block diagram illustrating a user interface device according to an embodiment of the present invention. Referring to FIG. 2, a user interface device according to an embodiment of the present invention includes a display unit 210, an input unit 230, and a control unit 220. Aspects of the present invention may be applied to a mobile device such as an MP3 player, a cellular phone, a personal digital assistant (PDA), or a portable multimedia player (PMP), but its application is not limited thereto. In addition, the user interface device may include a storage unit (not shown) to perform a function specific to the device.

The input unit 230 is a rotatable dial type input device. The input unit 230 includes a movement instruction unit 240 to instruct a movement of a highlight between selectable items displayed by the display unit 210, and a rotation unit 250 that can be rotated. It is understood that according to other aspects any distinguishing methods or selection marks other than a highlight may be used to choose between selectable items, such as a different font or style of a selected item or a check mark or arrow. The selectable items may be menu items, items in a list of reproducible contents, or items having corresponding functions that are executed when the items are selected. When a user rotates the input unit 230 using the rotation unit 250, or the user manipulates the movement instruction unit 240 included in the input unit 230, the control unit 220 receives a movement signal to move the highlight between the selectable items from the movement instruction unit 240 or a rotation signal from the rotation unit 250. The control unit 220 controls the device to perform a function corresponding to the received signal and generates a screen corresponding to a result obtained by performing the corresponding function. The screen is displayed on the display unit 210.

Figure 3:
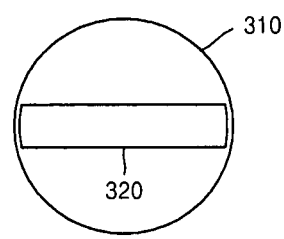
FIG. 3 is a view illustrating an input device according to an embodiment of the present invention.
Figure 4:
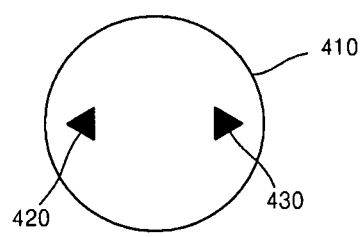
FIG. 4 is a view illustrating an input device according to another embodiment of the present invention.

The input unit 230 may have a form corresponding to one of the input devices shown in FIGS. 3 and 4. The movement instruction unit 240 may be a touch sensor or arrow keys. The movement instruction unit 240 is provided to be visibly distinct from the rest of the input unit 230. For example, the movement instruction unit 240 may be provided to have a long shape running from left to right or from top to bottom. Further, a graphic interface is aligned with the structure or layout of a physical input device (i.e., the movement instruction unit 240) so that the user can intuitively manipulate the direction of a movement. The touch sensor may be implemented using, for example, buttons, a touch pad, or a membrane.

FIG. 3 is a front view illustrating an input device 310 including a touch sensor (not shown) according to an embodiment of the present invention. Referring to FIG. 3, when the user touches a portion 320 of the input device 310 in which the touch sensor operates, a touch signal is generated. The portion 320 may be visibly distinct from the rest of the input unit 230. In addition, the portion 320 in which the touch sensor operates may be provided to have a long shape running from right to left or from top to bottom. However, it is understood that the portion 320 may run in any direction, such as diagonally or in a criss-cross. Due to the outer appearance of the input device 310, the user can intuitively manipulate a movement of a highlight. The touch sensor may sense touches in at least two directions. In this case, when the portion 320 in which the touch sensor operates runs in a horizontal direction as shown in FIG. 3, the touches in two directions are recognized by the control unit 220 as a movement of a highlight to the left or to the right. When the portion 320 in which the touch sensor operates runs in a vertical direction, the touches in two directions are recognized by the control unit 220 as movement of a highlight to the top or to the bottom. However, it is understood that according to other aspects, when the touch sensor operates in a horizontal direction, the control unit 220 may recognize the touches as a movement of a highlight to the top or to the bottom, or the control unit 220 may recognize the touches as a movement of a highlight to the left or to the right, or to the top or to the bottom, depending on a menu screen displayed on the display unit 210 and possible movements of the highlight. Likewise, it is understood that according to other aspects, when the touch sensor operates in a vertical direction, the control unit 220 may recognize the touches as a movement of a highlight to the left or to the right, or the control unit 220 may recognize the touches as a movement of a highlight to the left or to the right, or to the top or to the bottom, depending on a menu screen displayed on the display unit 210 and possible movements of the highlight.

The input device 310 is rotatable, and can be rotated clockwise or counterclockwise by a user at, for example, an angle of substantially 90°. The rotation unit 250 may be implemented to rotate at, for example, an angle of substantially 90° when the user lightly drags or touches his/her finger over the rotation unit 250. When the input device 310 rotates, a rotation signal indicating a rotation direction of the input device 310 is generated and output, and the control unit 220 determines a function to be performed according to the rotation direction indicated by the rotation signal. For example, when the input device 310 rotates in a first direction, a function of selecting a currently highlighted item is performed, and when the input device 310 rotates in a second direction, a function of canceling a previous selection is performed. The first direction may be a clockwise direction and the second direction may be a counterclockwise direction, or the first direction may be a counterclockwise direction and the second direction may be a clockwise direction according to aspects of the present invention. The function of selecting an item includes a function of executing a function associated with the item or a function of selecting a currently highlighted menu item to proceed to the next operation, such as another menu screen. In addition, the function of canceling a previous selection includes a function of returning to a menu screen of the previous operation.

FIG. 4 is a front view illustrating an input device 410 implemented using two input keys or buttons 420 and 430 according to another embodiment of the present invention. Referring to FIG. 4, the two buttons 420 and 430 represent movements in opposite directions from each other. When the user presses a button, a highlighted item movement signal to move the highlight in a corresponding direction is output. In addition, the buttons may be shaped and positioned such that the user easily recognizes the left and right directions.

According to an aspect, when the input device 410 is rotated, the two buttons 420 and 430 are arranged in a vertical direction and when the user presses the buttons 420 and 430, a highlight moves upward and downward, respectively. However, it is understood that according to another aspect, the two buttons 420 and 430 may be fixed and do not move with a rotation of the input device 410 and/or when the user presses the buttons 420 and 430, the highlight may move upward and downward or left and right, according to a menu screen displayed on the display unit 210 and possible movements of the highlight (that is, irrespective of the arrangement of the buttons 420 and 430). In addition, the rotation unit 250 of the input device 410 may be implemented similarly to the input device 310 of FIG. 3. The control unit 220 performs a function of selecting a currently highlighted item or a function of canceling a previous selection according to a rotation direction of the input device 410, which is indicated by a rotation signal from the rotation unit 250.

FIG. 5 is a flowchart illustrating a user interface method according to an embodiment of the present invention and explaining an interface method used in the device including the input unit having the touch sensor illustrated in FIG. 3. However, a device including another movement instruction unit, such as the input key illustrated in FIG. 4, may employ the aforementioned interface method.

Referring to FIG. 5, the control unit 220 receives an input signal from the input unit 230 (operation 502). When the received signal is a touch signal, a movement direction of a highlight in the screen is determined according to a touch direction sensed by the touch sensor, and a function of moving the highlight in the determined direction is performed (operation 504). When the received signal is a rotation signal, a function based on a rotation direction is performed (operation 506). For example, in response to a clockwise rotation, the control unit 220 performs a function of selecting a currently highlighted item. In response to a counterclockwise rotation, the control unit 220 performs a function of canceling a previous selection or returning to a menu of the previous operation (operation 506). In addition, when an item is selected, the control unit 220 generates a menu of the next operation or a new screen. According to an aspect, when the menu is generated, the control unit 220 may generate the menu so that the menu items are aligned in a direction perpendicular to that of the previous menu. More specifically, when the rotation signal is received, the input unit 230 is in a state of being rotated at an angle of substantially 90°. Therefore, the portion 320 in which the touch sensor operates may also be rotated, so that the direction in which the portion 320 runs is also changed. Accordingly, a menu screen in which menu items are arranged to be aligned with the portion 320 in which the touch sensor operates needs to be generated (operation 508).

FIGS. 6 to 14 illustrate operations of a mobile device implemented in aspects of the present invention. In addition, the mobile device including the input unit having the touch sensor, as described with reference to FIGS. 3 and 5, is illustrated. However, another type of device or a mobile device including another movement instruction unit, such as input keys as illustrated in FIG. 4, operates similarly to the aforementioned mobile device.

FIG. 6 is a view illustrating a movement of a highlight in a horizontal direction in the user interface device according to an embodiment of the present invention. Referring to FIG. 6, menu items 600 are arranged in the horizontal direction. The portion 320 in which the touch sensor operates is also arranged in the horizontal direction. As described above, when the user rubs the portion 320 in which the touch sensor operates to the right or to the left, a highlight is moved to the right or to the left among the menu items 600.

Figure 7:
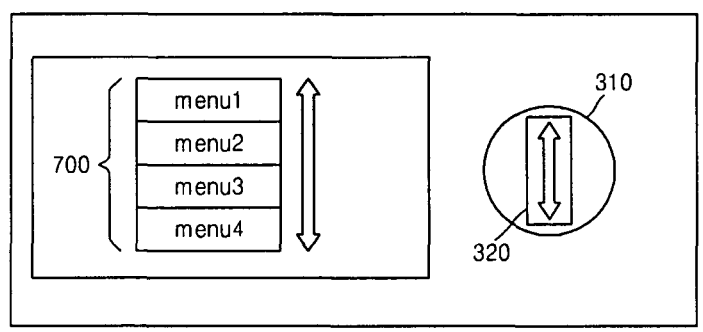
FIG. 7 is a view illustrating movement of a highlight in a vertical direction in a user interface device according to an embodiment of the present invention.

FIG. 7 is a view illustrating a movement of a highlight in a vertical direction in the user interface device according to an embodiment of the present invention. Referring to FIG. 7, menu items 700 are arranged in the vertical direction. The portion 320 in which the touch sensor operates is also arranged in the vertical direction. As described above, when the user rubs the portion 320 in which the touch sensor operates toward the top or the bottom, a highlight is moved toward the top or the bottom among the menu items 700.

Figure 8:
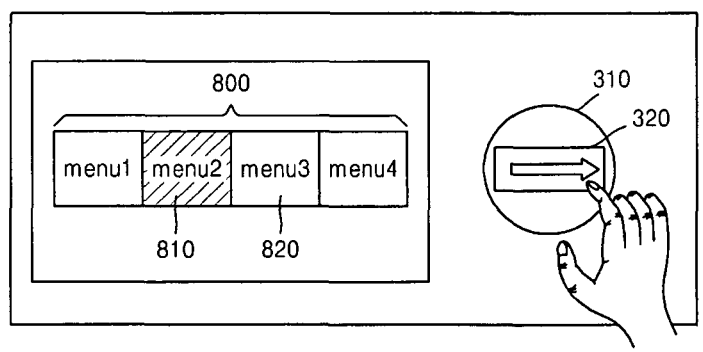
FIG. 8 is a view illustrating a user manipulation to move a highlight in a rightward direction in a user interface device according to an embodiment of the present invention.

FIG. 8 is a view illustrating a user manipulation to move a highlight in a rightward direction in a user interface device according to an embodiment of the present invention. Referring to FIG. 8, menu items 800 and the portion 320 in which the touch sensor operates are arranged in the horizontal direction. In order to move a highlight from a menu2 item 810 to a menu3 item 820, the user rubs the portion 320 in which the touch sensor operates to the right.

Figure 9:
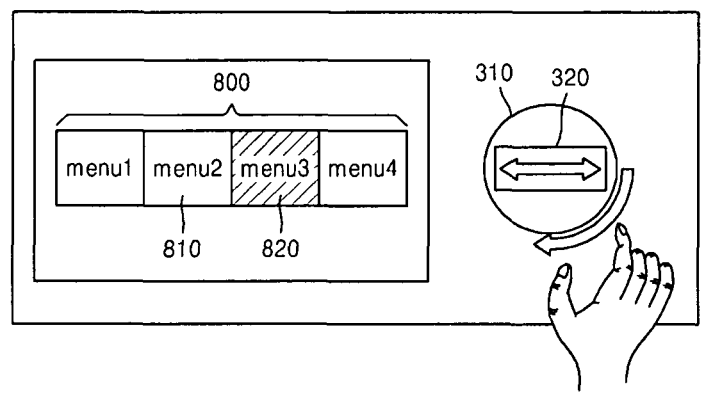
FIG. 9 is a view illustrating a user manipulation to select a menu item.

FIG. 9 is a view illustrating a user manipulation to select a menu item of FIG. 8. Referring to FIG. 9, in order to select the highlighted menu3 item 820, the user rotates the input device 310 clockwise. As described above, when the user lightly drags his/her finger in a clockwise direction over the input device 310, the input device 310 may rotate clockwise automatically at, for example, an angle of substantially 90°.

Figure 10:
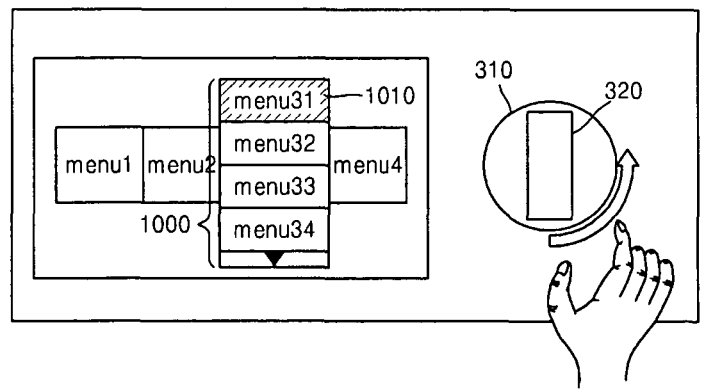
FIG. 10 is a view illustrating a user manipulation to cancel a selection.

FIG. 10 is a view illustrating a user manipulation to cancel a selection in FIG. 9. Referring to FIG. 10, the menu3 item 820 is selected, so that a submenu (a menu of the next operation) is displayed in the vertical direction. In order to cancel the previous selection of the menu3 item 820 (that is, in order to return to the previous menu 800), the user rotates the input device 310 counterclockwise. Similar to the aforementioned operation of selecting a menu, when the user lightly drags his/her finger in a counterclockwise direction over the input device 310, the input device 310 may automatically rotate counterclockwise at, for example, an angle of substantially 90°. When the user rotates the input device 310 clockwise, the menu31 item 1010 that is currently highlighted is selected, and a function corresponding to the menu31 item 1010 is performed, or a submenu is displayed.

Figure 11:
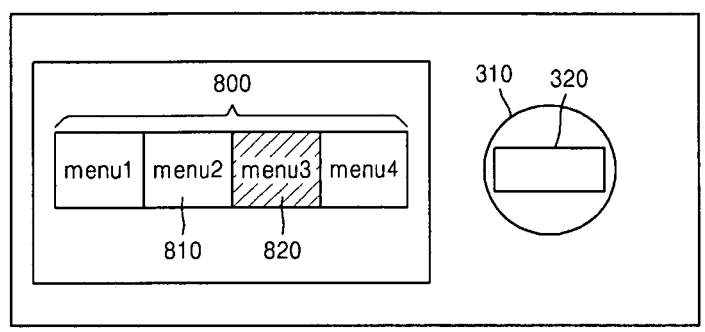
FIG. 11 is a view illustrating the state of a user interface device after canceling the selection of FIG. 10.

FIG. 11 is a view illustrating the state of a user interface device after canceling the selection of FIG. 10. The state of the user interface device is returned to the state of FIG. 9.

Figure 12:
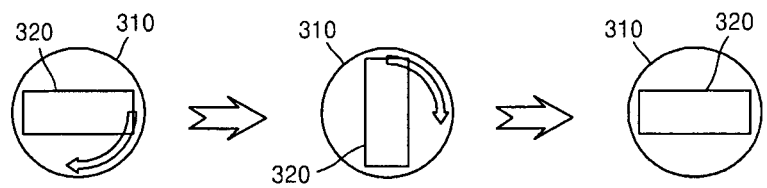
FIG. 12 is a view illustrating the state of an input device that is rotated clockwise to input a selection function according to an embodiment of the present invention.

FIG. 12 is a view illustrating the state of an input device that is rotated clockwise to input a selection function according to an embodiment of the present invention. First, the input device 310 is in a state of being rotated so that the portion 320 in which the touch sensor operates is arranged in the horizontal direction. Thereafter, the input device 310 is rotated clockwise by, for example, an angle of substantially 90°. As described above, in response to the clockwise rotation of the input device 310, a function is performed or the process proceeds to the next step, such as displaying another menu.

Figure 13:
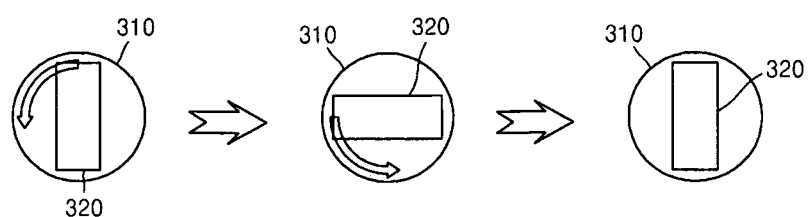
FIG. 13 is a view illustrating the state of an input device that is rotated counterclockwise to input a cancel function according to an embodiment of the present invention.

FIG. 13 is a view illustrating the state of an input device that is rotated counterclockwise to input a cancel function according to an embodiment of the present invention. First, the input device 310 is in a state of being rotated so that the portion 320 in which the touch sensor operates is arranged in the vertical direction. Thereafter, the input device 310 is rotated counterclockwise by, for example, an angle of substantially 90°. As described above, in response the counterclockwise rotation of the input device 310, an item selection is canceled or the process returns to the previous operation, such as displaying the previous menu.

Figure 14:
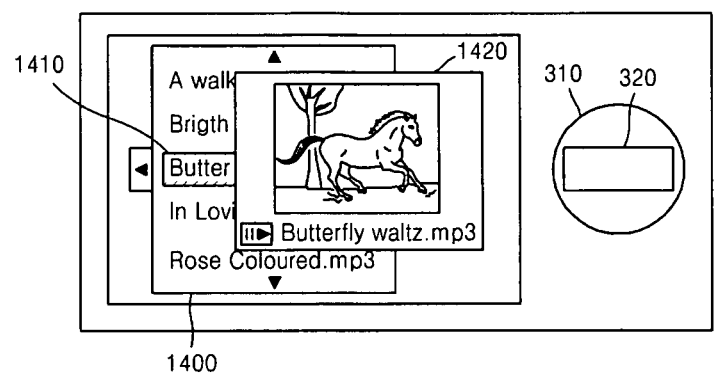
FIG. 14 is a view illustrating an example of performing a music reproduction function using a user interface according to an embodiment of the present invention.

FIG. 14 is a view illustrating an example of performing a music reproduction function using the user interface according to an embodiment of the present invention. Referring to FIG. 14, through a few steps of user manipulation, a reproducible music list 1400 is displayed in the vertical direction, and by rotating the input device 310 clockwise again, a highlighted item 1410 is selected to execute a player 1420 to reproduce associated music, and at the same time, the portion 320 in which the touch sensor operates is arranged in the horizontal direction. In this state, when the user rotates the input device 310 counterclockwise, the player 1420 is terminated, and the reproducible music list corresponding to the previous operation is displayed at the top.

While the descriptions in reference to FIGS. 6 to 14 refer to a horizontal direction, a vertical direction, a right, a left, a top, and a bottom, it is understood that these directional references are made in conjunction with the FIGs. and relative to the orientation of the device in the FIGs. It is understood that other directions, relative to the orientation of the device in the FIGs. or other orientations of the device, are well within the scope of aspects of the present invention.

According to an aspect of the present invention as described above, a user intuitively and easily navigates menus of a device, and a desired function is performed by using a touch sensor and an input device having a dial or rotating function. In addition, all movement operations of up, down, right, and left may be controlled by using a straight touch wheel. Aspects of the present invention as described above can also be embodied as computer-readable codes on a computer-readable recording medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A user interface device comprising:
    a display unit to display a first menu comprising one or more selectable menu items parallel to a first direction and a second direction and a selection mark;
    an input unit comprising:
        a movement instruction unit to output a movement signal instructing a movement of the selection mark in the first direction or the second direction among the one or more selectable menu items parallel to the first direction and the second direction, and
        a rotation unit that is rotatable to output a rotation signal instructing a selection of a selectable menu item distinguished by the selection mark in the display unit;
        wherein the movement instruction unit is rotated along with the rotation unit, and outputs a movement signal instructing a movement of the selection mark in a third direction or a fourth direction perpendicular to the first and second directions when the rotation unit is rotated in a first rotation direction; and
    a control unit to generate a second menu corresponding to the selectable item distinguished by the selection mark and to control the display unit to display the generated second menu, the second menu comprising menu items arranged parallel to the third and fourth directions, when a first rotation signal indicating that the rotation unit is rotated in the first rotation direction from the rotation unit, and
    remove the second menu from the display unit when a second rotation signal indicating that the rotation unit is rotated in a second rotation direction from the rotation unit.

2. The device as claimed in claim 1, wherein the selection mark is a highlight.

3. The device as claimed in claim 1, wherein the movement instruction unit receives a first direction input to instruct the movement of the selection mark in a first direction, and a second direction input to instruct the movement of the selection mark in a second direction.

4. The device as claimed in claim 3, wherein:
    the movement instruction unit comprises a touch sensor to sense touches in at least two directions to receive the first direction input or the second direction input; and
    the movement signal is generated from the touches in the at least two directions.

5. The device as claimed in claim 4, wherein the input unit comprises a portion on which the touch sensor operates that is visibly distinct on a surface of the input unit and is provided to have a length, longer than a width, running horizontally or vertically on the surface of the input unit.

6. The device as claimed in claim 1, wherein the rotation unit is rotated clockwise or counterclockwise at an angle of substantially 90° by user manipulation.

7. The device as claimed in claim 3, wherein:
    the movement instruction unit comprises at least two input keys to receive the first direction input or the second direction input; and
    the movement signal is generated from presses of the at least two input keys.

8. The device as claimed in claim 1, wherein the input unit comprises a portion on which the movement instruction unit operates that is visibly distinct on a surface of the input unit and is provided to have a length, longer than a width, running horizontally or vertically on the surface of the input unit.

9. A user interface method used in a device including a rotatable input unit, the method comprising:
    displaying a first menu in which one or more selectable menu items are arranged parallel to a first direction and a second direction;
    in response to a movement signal from a movement instruction unit of the input unit, performing a movement of a selection mark in the first direction or the second direction among the selectable menu items parallel to the first direction and the second direction;
    in response to a first rotation signal from a rotation unit of the input unit indicating that the rotation unit of the input unit is rotated in a first rotation direction, generating a second menu corresponding to the selectable item distinguished by the selection mark, the second menu comprising menu items arranged parallel to a third and fourth directions perpendicular to the first and second directions, displaying the generated second menu, and rotating the movement input unit along with the rotation unit;
    in response to a movement signal from the rotated movement instruction unit, performing a movement of a selection mark in the third direction or the fourth direction among the menu items parallel to the third and fourth directions; and
    in response to a second rotation signal from the rotation unit indicating that the rotation unit is rotated in a second rotation direction, removing the second menu from the display unit and rotating the movement input unit along with the rotation unit.

10. A computer readable recording medium encoded with the method of claim 9 implemented by a computer.

* * * * *